US008160745B2

(12) United States Patent
Sugiura (10) Patent No.: US 8,160,745 B2
(45) Date of Patent: Apr. 17, 2012

(54) ROBOTS WITH OCCLUSION AVOIDANCE FUNCTIONALITY

(75) Inventor: Hisashi Sugiura, Frankfurt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 1062 days.

(21) Appl. No.: 12/053,218

(22) Filed: Mar. 21, 2008

(65) Prior Publication Data

US 2008/0312771 A1 Dec. 18, 2008

(30) Foreign Application Priority Data

Mar. 23, 2007 (EP) .................................. 07104820

(51) Int. Cl.
*G06F 17/00* (2006.01)
(52) U.S. Cl. ............... 700/245; 700/259; 901/1; 901/47
(58) Field of Classification Search .................. 700/259, 700/245; 901/1, 47
See application file for complete search history.

(56) References Cited

U.S. PATENT DOCUMENTS

| | | | |
|---|---|---|---|
| 5,347,459 A * | 9/1994 | Greenspan et al. ............ 700/255 |
| 5,737,500 A * | 4/1998 | Seraji et al. .................... 700/251 |
| 6,023,645 A | 2/2000 | Harima et al. |
| 6,181,983 B1 * | 1/2001 | Schlemmer et al. .......... 700/245 |
| 6,438,456 B1 * | 8/2002 | Feddema et al. ............... 700/245 |
| 6,493,607 B1 * | 12/2002 | Bourne et al. ................. 700/255 |
| 6,678,582 B2 * | 1/2004 | Waled ............................ 700/245 |
| 6,687,571 B1 * | 2/2004 | Byrne et al. ................... 700/245 |
| 6,922,034 B2 | 7/2005 | Hirose |
| 7,257,237 B1 | 8/2007 | Luck et al. |
| 7,313,463 B2 * | 12/2007 | Herr et al. ...................... 700/245 |
| 7,403,880 B2 * | 7/2008 | Maille et al. ....................... 703/2 |
| 7,415,321 B2 * | 8/2008 | Okazaki et al. ............... 700/245 |
| 7,626,569 B2 * | 12/2009 | Lanier ........................... 345/156 |
| 7,859,540 B2 * | 12/2010 | Dariush ......................... 345/474 |
| 2006/0095160 A1 * | 5/2006 | Orita et al. .................... 700/248 |
| 2006/0111881 A1 * | 5/2006 | Jackson ............................. 703/2 |
| 2007/0162164 A1 * | 7/2007 | Dariush .......................... 700/61 |
| 2008/0312771 A1 * | 12/2008 | Sugiura ......................... 700/259 |
| 2011/0035050 A1 * | 2/2011 | Kim et al. ..................... 700/246 |

OTHER PUBLICATIONS

Extended European Search Report for application No. 07104820.1-1239, dated Oct. 25, 2007, 7 pages.
Extended European Search Report for application No. 07104815.1-1239, dated Feb. 2, 2008, 13 pages.

(Continued)

*Primary Examiner* — Thomas Black
*Assistant Examiner* — Wae Louie
(74) *Attorney, Agent, or Firm* — Fenwick & West LLP (57) ABSTRACT

A method for controlling a robot having at least one visual sensor. A target for a motion of the robot is defined. A motion control signal adapted for the robot reaching the target is calculated. A collision avoidance control signal based on the closest points of segments of the robot and a virtual object between the visual sensing means and the target is calculated. The motion control signal and the collision avoidance control signal are weighted and combined. The weight of the motion control signal is higher when a calculated collision risk is lower. The motion of the robot is controlled according to the combined signal so that no segment of the robot enters the space defined by the virtual object.

13 Claims, 4 Drawing Sheets

OTHER PUBLICATIONS

Bojan Nemec et al., *Implementation of Force Control on Redundant Robot*, Proceedings of the 1998 IEEE/RSJ Intl. Conference on Intelligent Robots and Systems, Oct. 1998, pp. 1314-1319.

Michael Gienger et al., *Task-Oriented Whole Body Motion for Humanoid Robots*, Proceedings for the 2005 $5^{th}$ IEEE-RAS International Conference on Humanoid Robots, 2005, pp. 238-244.

Michael Gienger et al., *Exploiting Task Intervals for Whole Body Robot Control*, Proceedings of the 2006 IEEE/RSJ International Conference on Intelligent Robots and Systems, Oct. 9-15, 2006, pp. 2484-2490.

James Kuffner et al., *Self-Collision Detection and Prevention for Humanoid Robots*, Proceedings of the 2002 IEEE International Conference on Robotics & Automation, May 2002, pp. 2265-2270.

James Kuffner et al., *Dynamically-Stable Motion Planning for Humanoid Robots*, Autonomous Robots, 2002, pp. 105-118, vol. 12.

* cited by examiner

ROBOTS WITH OCCLUSION AVOIDANCE FUNCTIONALITY

RELATED APPLICATIONS

This application claims priority under 35 U.S.C. §119(a) to European Patent Application number 07 104 820, filed on Mar. 23, 2007, which is incorporated by reference herein in its entirety. This application is related to U.S. patent application Ser. No. 12/052,483, filed on Mar. 20, 2008; and U.S. patent application Ser. No. 12/050,948, filed on Mar. 19, 2008, which are incorporated by reference herein in their entirety.

FIELD OF THE INVENTION

The present invention generally relates to robots, and specifically to robots acting autonomously.

BACKGROUND OF THE INVENTION

When controlling a trajectory of an effector such as a robot, a target state needs to be defined. The target state is, for example, defined as an object that is to be handled by a manipulating arm of a robot. In general, the position of the object can be described by three parameters. In addition to the object position, it is necessary to describe a spatial orientation which is often described by Kardan-angles or Euler-angles.

To carry out the movement of an effector in a robot, the trajectory is usually generated by mapping increments from a control parameter space to configuration space.

The control parameter space or task space is the space of the command elements. The control parameter space is composed of the command elements. The command (also "target" or "task") elements are the elements of a respective command vector. These elements define a useful description of what should be controlled, for example, the position of a hand or the tilting angle of a head. The configuration space is the space of controllable degrees of freedom. The configuration space can be composed of individual joints of a robot and/or more complex kinematics mechanisms to which controllable degrees of freedom can be assigned.

"Null space" represents the dimensional difference between the joint space and the task space. The null space contains the redundant degrees of freedom, in which movements can be carried out without affecting the task space motion. The null space is defined as the set of arguments of a linear operator such that the corresponding function value is zero. Redundant systems have a (local) null space that can be used to address a secondary objective, such as kinematic conditioning, without disturbing a primary task.

Conventionally, targets of robots were provided by operators and the robots merely tracked planned trajectories. The safety mechanism in conventional robots is an emergency stop mechanism that simply freezes motions, if any motions were being performed. Modern robots, in particular humanoid robots, are expected to work outside the typical environment such as factories. The modern robots need to interact with dynamic environment that is less predictable. The advantage of using the collision avoidance is not only safety. The collision avoidance does not necessarily stop the robot's target reaching motions and may expand the robot's working range.

The known collision avoidance mechanism may be divided into two categories. One category of collision avoidance mechanism is a planning (non real-time) method which generates trajectories taking obstacles into account.

James Kuffner et al., "Self-collision detection and prevention for humanoid robots," In proceedings of the IEEE International Conference on Robotics and Automation, 2002, which is incorporated by reference herein in its entirety, proposes a collision avoidance on a humanoid robot. This document proposes a fast collision detection method and a real-time planning for gait generations taking leg interference into account.

James Kuffner et al., "Dynamically-stable motion planning for humanoid robots," Autonomous Robots, volume 12, pages 105-118, 2002, which is incorporated by reference herein in its entirety, proposes a dynamics based collision free planning method using Rapidly exploring Random Trees (RRTs). However, these methods are difficult to apply to interactive motions because the computation time becomes longer as the degrees of freedom of robots (e.g., humanoid robots) increase.

Another category of the collision avoidance is reactive (real-time) collision avoidance. The reactive collision avoidance modifies trajectories that are quite simple such as line segments connecting current positions and target positions.

In order to use this method, the direction of avoidance and how to switch the priority between target reaching motions and collision avoidance motions depending on the magnitude of danger of collisions in real-time must be decided. For instance, if the distance between segments is large enough, target reaching motions should have higher priority than collision avoidance motions.

Null space optimization criteria may be used for collision avoidance (see, for example, Michael Gienger, Herbert Janssen, and Christian Goerick, "Task-oriented whole body motion for humanoid robots," In proceedings of the IEEERAS International Conference on Humanoid Robots, 2005; and Michael Gienger, Herbert Janssen, and Christian Goerick, "Exploiting task intervals for whole body robot control," In proceedings of the IEEE/RSJ International Conference on Intelligent Robots and Systems, 2006, which are incorporated by reference herein in their entirety).

A particular case of collision avoidance is occlusion avoidance. When a robot arm moves towards a target that is captured by its visual sensors (e.g., cameras), sometimes an arm segment blocks the target by its own movements. This sometimes causes oscillations. For example, if the robot loses the target, it retracts the arm. After the target reappears and the robot again reaches for the target.

SUMMARY OF THE INVENTION

It is an object of the present invention to provide an occlusion avoidance technique for a robot having visual sensors.

Embodiments of the present invention set up a virtual object between cameras and targets. Then a real-time collision avoidance control is performed taking into account the virtual object. The robot's segments such as arms will not penetrate a space defined by the virtual object. Thus, the trajectory of the arm moves to the target while avoiding the space defined by the virtual object. When the hand comes close to a target, the space defined by the virtual object becomes smaller.

The motion control calculation includes the step of mapping a collision avoidance motion in null space and a target reaching motion in task space. Thus, the motion control calculation takes into account collision avoidance in the null space.

One embodiment of the present invention relates to controlling a robot having at least one visual sensor. The target of a motion of the robot is defined. A motion control signal adapted for the robot reaching the target is then calculated. A collision avoidance control signal based on the closest points of segments of the robot and a virtual object between the visual sensor and the target are calculated. The motion control signal and the collision avoidance control signal are combined. The weight of the motion control output signal is higher when a calculated collision risk is lower. A motion of the robot is controlled according to the combined signal such that no segment of the robot enters the space defined by the virtual object.

In one embodiment of the present invention, the virtual object may be symmetrical around an axis connecting the center of the visual sensor and the target center position.

In one embodiment of the present invention, the virtual object may define a space having the contours of a three dimensional ellipsoid.

In one embodiment of the present invention, the weights can be changed gradually in order to perform a soft task switching between target reaching by motion and collision avoidance.

In one embodiment of the present invention, the motion control calculation includes the step of mapping a collision avoidance motion in the null space and a target reaching motion in the task space.

In one embodiment of the present invention, the weight of the collision avoidance output signal can be zero as long as the distance between the closest points is larger than a preset avoidance threshold distance.

In one embodiment of the present invention, the method comprises the steps of carrying out a collision avoidance control. The collision avoidance control is achieved by calculating two closest points of different segments of the robot connected to each other via at least one joint or two closest points between a segment of the robot and another object. Then the collision avoidance motion of the robot is controlled in the direction parallel along a line connecting between the two closest points.

In one embodiment of the present invention, the null space of the collision avoidance control may be used for a motion associated with reaching the target.

In one embodiment of the present invention, the collision avoidance control may map a collision avoidance motion to the task space and a target reaching motion to the null space.

One embodiment of the present invention also relates to a computer program product, implementing the above technique.

One embodiment of the present invention relates to a robot having visual sensor and a motion control unit. The motion control unit of the robot includes a distance computing module, a motion control module, a collision avoidance module, a blending control unit for combining the output control signals of the motion control module and the collision avoidance control module to generate a motion control signal for the robot. The distance computing module calculates the two closest points between a segment of the robot and a virtual object defining a space between the visual sensor and a target. The motion control module calculates a motion control signal commanding a robot to reach a target. The collision avoidance module calculates a collision avoidance control signal based on the closest points of the segment of the robot and the virtual object. The blending control unit assigns weights to the motion control signal and the collision avoidance control signal to generate weighted motion control signal and weighted collision avoidance signal. The weight of the motion control signal is assigned a higher value when the risk of collision is lower. The weight of the collision avoidance control signal assigned a higher value when the risk of collision is higher. The blending control unit also combines the weighted motion control signal and the weighted collision avoidance control signal to generate a combined weighted signal according to which a motion of the robot is controlled.

In one embodiment of the present invention, the robot is a humanoid biped robot.

In one embodiment of the present invention, the technique is implemented on a humanoid robot such as a bipedal walking robot. The arm may avoid occlusion of the visual sensor of the robot.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. Effectors include manipulators in industrial robots. In humanoid robotics, the effector is often defined as a reference point of the hand such as the finger tip. The effector could also be the head, which is controlled to face a certain point or in certain direction.

Task coordinates refer to coordinates in which the movement of the effector is described. There are many ways to describe effector motions. To describe the positions of the effectors, the x, y and z elements of a position vector are commonly chosen. For spatial orientations, the task is often described in Euler angles or quaternions. In many cases, special descriptions for a task are used.

Task space refers to the space that is described by the task coordinates. For example, if the hand position of a robot is controlled in x, y and z direction, the task space has a dimension of three (3) and is described by these coordinates.

Null space refers to the space where a motion does not influence the task space motion. For example, if a robot has seven (7) degrees of freedom, and the task vector is three (3) dimensional hand position, then the null space has four (4) dimensions. The system is redundant with respect to the task. All motions of the arm that do not interfere with the task motion are referred to as the null space motion herein.

Trajectory is a continuous path describing the motion of a system. The trajectory can describe the path of the individual joints or a path represented in the task coordinates.

Distance Computation

For collision avoidance, it is necessary to compute distances and closest points between segments which are physical links separated by joints. It is more complex to compute actual distances and closest points for all possible segment pairs of humanoid robots within a constrained computation time, especially when the computation is performed on an embedded computer of the robot.

Figure 1:
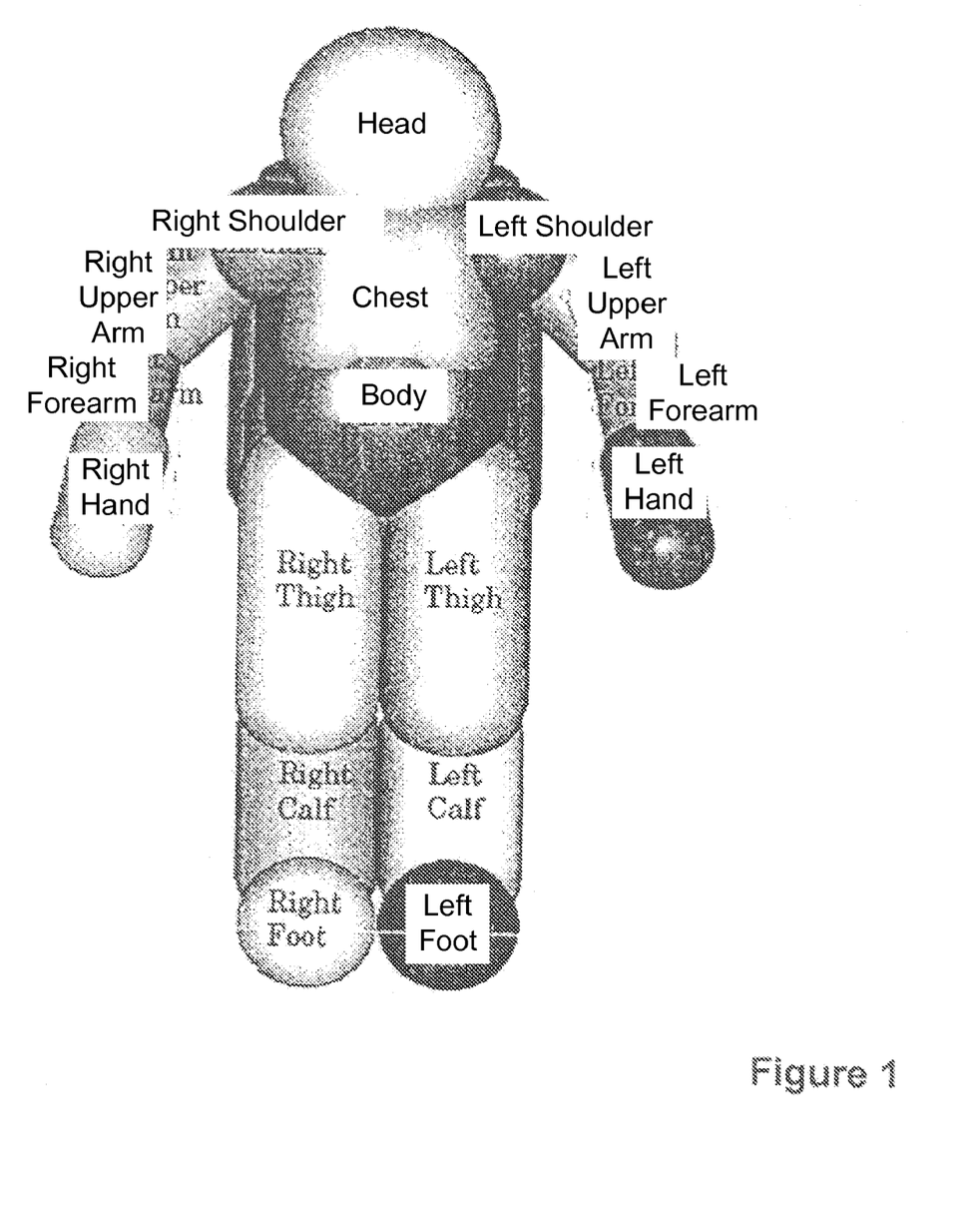
FIG. 1 is a diagram illustrating a humanoid robot having seventeen (17) segments where each segment comprising one or more sphere swept-lines or spheres, according to one embodiment of the present invention.

Therefore, in one embodiment of the present invention, a collision model with primitive objects as shown in FIG. 1 is defined. Each segment (Head, Right Shoulder and so on) is composed of one or more spheres or swept sphere lines (SSLs) in order to cover the shape of the robot. The distances and closest points are then calculated based on this model.

Figure 5:
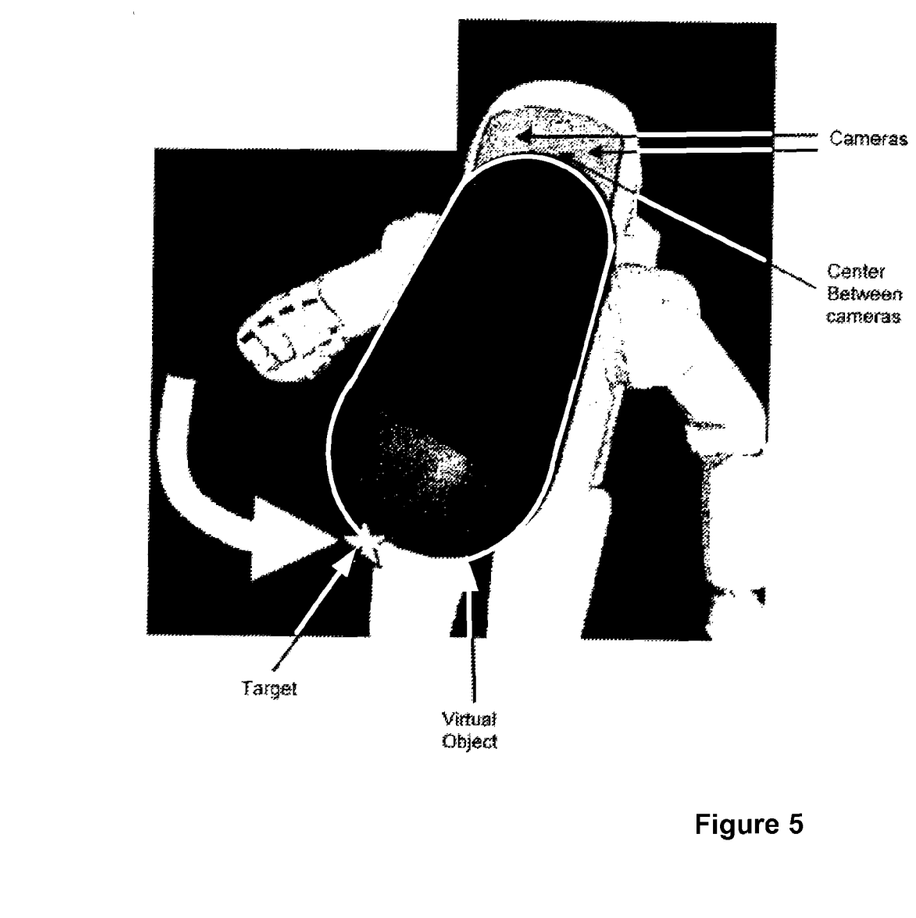
FIG. 5 illustrates occlusion avoidance, according to one embodiment of the present invention.

In addition, a virtual object as shown in FIG. 5 is taken into account. Therefore, computation of distances and closest points between a segment of the robot (for example, an arm) and the virtual object is also performed.

As illustrated in FIG. 5, the robot is a humanoid robot with a moveable head having two cameras at its fronts. The virtual object to be avoided by segments of the robot is adaptively arranged between the cameras and the target. "Adaptively" means that the virtual object may be changed according to the position of the target associated with the robot's reaching motion relative to the cameras.

Collision Avoidance

Figure 2:
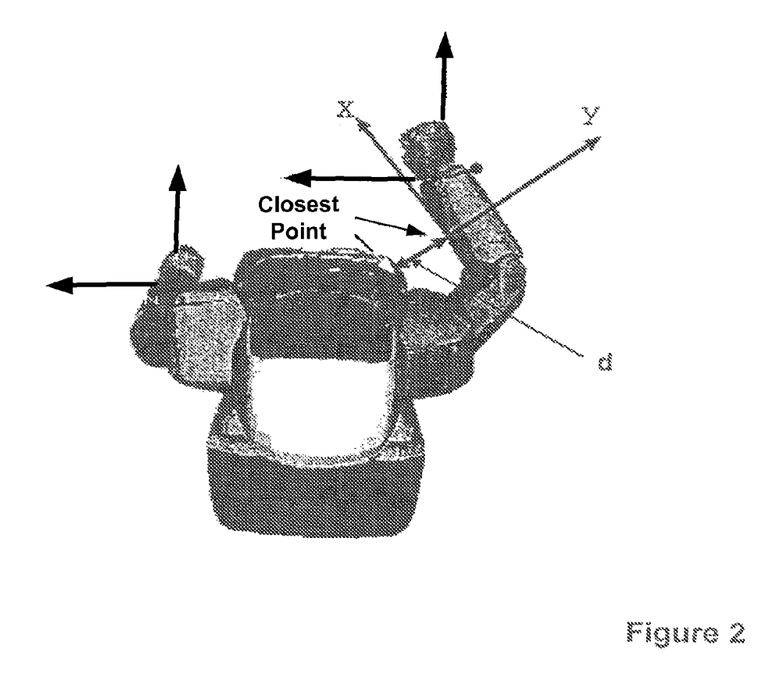
FIG. 2 is a diagram illustrating a collision avoidance coordinate system, according to one embodiment of the present invention.

The role of collision avoidance is to move away segments that are close to each other. One of the most efficient ways to move away the segments apart is by moving the segments in a direction parallel to the vector that connects closest two points of the segments. A collision avoidance coordinate system is defined for task space motions in the collision avoidance control. An example of the collision avoidance coordinate system is defined as illustrated in FIG. 2. The origin is the closest point on the lower arm. y-axis is aligned to a line that connects the closest points so that the direction of avoidance is aligned to this axis. x-axis is aligned to the vector that extends from the elbow to the wrist position. z-axis is an outer product of a unit vector of x direction and a unit vector in y direction. The collision avoidance moves segments only in the y direction on this coordinate system.

In one embodiment of the present invention, only one degree of freedom is used for the collision avoidance instead of three degrees of freedom. The other degrees of freedom remain available for the null space and for target reaching motions.

Figure 3:
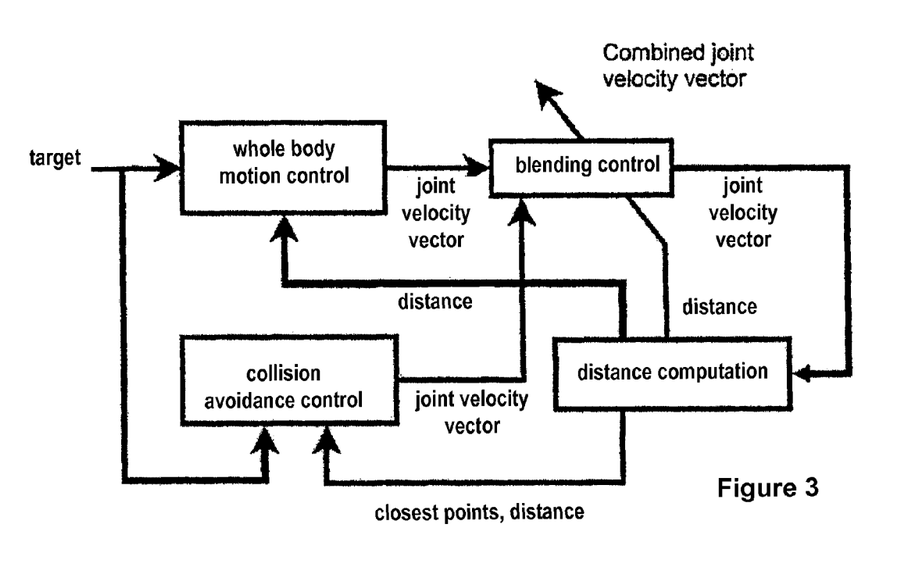
FIG. 3 is a block diagram illustrating control modules of a robot, according to one embodiment of the present invention.
Figure 4:
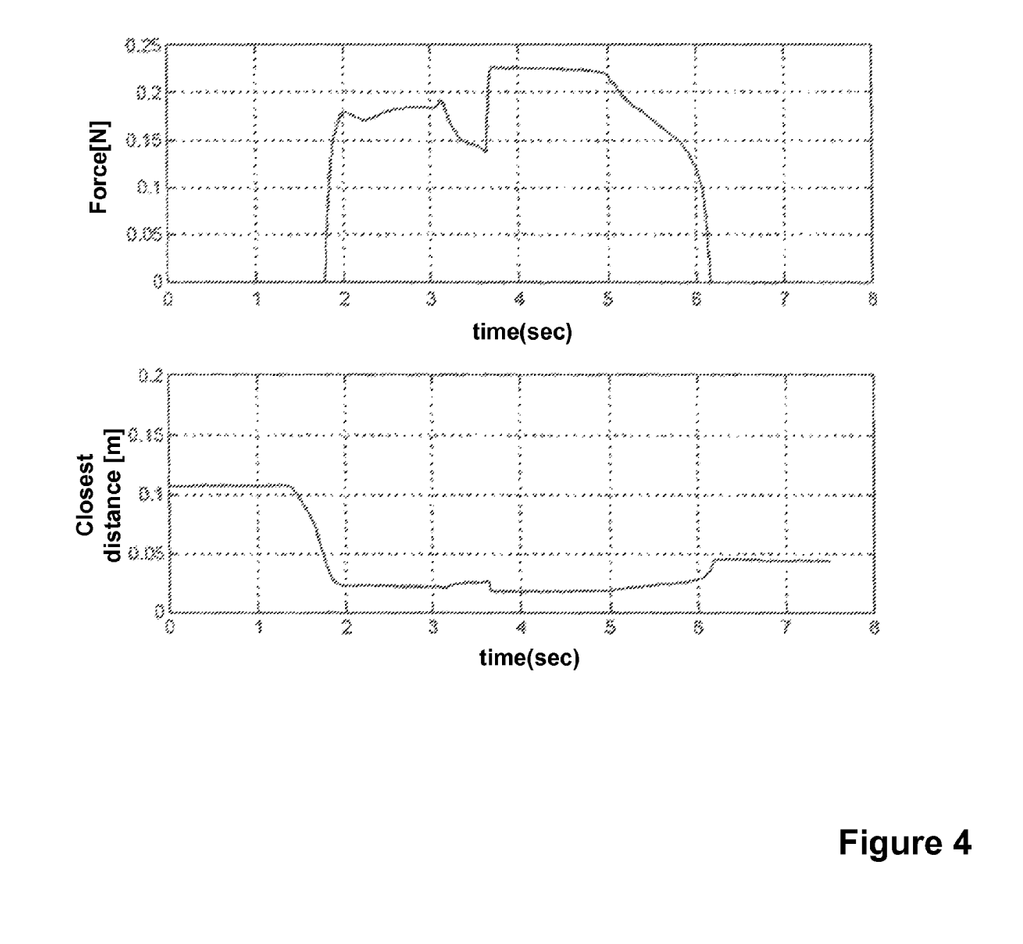
FIG. 4 illustrates virtual force as a function of the closest distance, according to one embodiment of the present invention.

FIG. 3 is a diagram illustrating main computing blocks, according to one embodiment of the present invention. A target (defined externally or by the robot itself) is provided to a motion control unit such as a whole body motion (WBM) control unit and a collision avoidance (CA) unit. The whole body motion is to be understood as being merely an example of a motion of the robot.

The motion control unit outputs a first joint velocity vector signal to a blending unit which combines this signal with a second joint velocity vector signal from the CA control unit. The blending control unit outputs a combined joint velocity vector basis on which the robot's motion is controlled.

The combined joint velocity vector is furthermore provided to a distance computing unit that calculates the two closest points of different segments of the robot connected to each other via at least one joint or a segment of the robot and another object. The distance computing unit outputs closest point data and distance information to the CA control unit. The distance computing unit also outputs distance information to the motion control unit and to the blending unit. The blending unit calculates the blending ratio between the first and the second joint velocity vector on the basis of the supplied distance information.

A. Collision Avoidance Control Using Null Space Criteria

Generally, the Cartesian position and orientation x of an effector of a robot can be described as a function of the vector of joint variables q of the manipulator.

$$x = f(q)$$

While this equation can be obtained easily, the inverse problem is crucial. In redundant cases, it is generally not possible to find an inverse mapping $f^{-1}$. Instead of constructing an inverse function $g(x)$ with $$f(g(x)) = x$$

analytically, the problem is often reformulated in the velocities utilizing the partial derivation of $f(q)$ $$\dot{x} = J(q)\dot{q}$$
$$J = \frac{\partial f(q)}{\partial q}$$

Because the inverse of the non-square (analytical) Jacobian $J(q)$ does not exist in the redundant case, the pseudo inverse is utilized.

The task space is used for collision avoidance and the null space is used for moving towards the target using a potential function (cost function). In this control method, each joint velocity is computed as:

$$\dot{q}_{ca} = J_{ca}^{\#}(q)|_{row,y} \dot{y}_{ca} + N_{ca}\xi_t, \quad (1)$$

where $J_{ca}(q)$ is the collision avoidance Jacobian between closest points, $N_{ca}$ is a matrix which maps $\xi$ to the null space, $J_{ca}^{\#}(q)|_{row,y}$ is the row vector extracted from the pseudo inverse Jacobian $J_{ca}(q)$ and which is in the y axis in the collision avoidance coordinate system illustrated in FIG. 2, and $\dot{y}_{ca}$ is an avoidance velocity which is derived from a virtual force $F_{virtual}$.

In this example, the collision avoidance takes over control for only one degree-of-freedom (specifically, the y-direction) in order to avoid the closest segment. Zje collision avoidance does not affect other degrees of freedom, which remain available for the task execution (e.g., target reaching motions related to x and z direction). This means that the collision avoidance uses one degree of freedom for each arm respectively.

In the following equation (2), D is a pre-set non zero dampening coefficient.

$$\dot{y}_{ca} = \frac{F_{virtual}}{D} \quad (2)$$

$$F_{virtual} = \begin{cases} d_a - d & \text{if } d < da \\ 0 & \text{otherwise} \end{cases} \quad (3)$$

If the distance d between the closest points is shorter than a threshold distance $d_a$ set for activating/deactivating the collision avoidance, the virtual force value and the avoidance velocity is greater than zero. The virtual force and the avoidance velocity increase proportional (e.g., linearly) to the difference between d and $d_a$. Thus the collision avoidance is activated as soon as the closest point distance d is smaller than the preset threshold value $d_a$. (In the example of FIG. 2, the distance d between the closest points of the robot is indicated as the distance between the right arm and the front of the body of the humanoid robot).

$N_{ca}$ matrix which maps $\xi$ into null space and I is the identity matrix.

$$N_{ca} = I - J_{ca}(q)^{\#}J_{ca}(q) \quad (4)$$

The potential function $H_t(r)$ leads to the target for the null space. Let $\alpha(t)$ be a step width.

$$\xi_t = -\alpha_t \left(\frac{\partial H_t(r)}{\partial q}\right)^T \quad (5)$$

$$\frac{\partial H_t(r)}{\partial q} = \frac{\partial H_t(r)}{\partial r} \frac{\partial r}{\partial q} \quad (6)$$
$$= \frac{\partial H_t(r)}{\partial r} J(q)$$

$$H_t(r) = \frac{1}{2}(r_{curr} - r_t)^T W_t (r_{curr} - r_t) \quad (7)$$

where $W_t$ is a weighting matrix, and $r_t$ is a target vector

Thus, the collision avoidance controls joints for the collision avoidance in task space and the target reaching in null space.

B. Motion Control

On the other hand, the whole body motion control is used in order to control the robot that has redundant degrees of freedom also with null space optimization criteria as, $$\dot{q}_{wbm} = J_{wbm}^{\#}(q)\dot{x}_{task} + N_{wbm}\xi_{wbm} \quad (8)$$

$$N_{wbm} = I - J_{wbm}^{\#}(q)J_{wbm}(q) \quad (9)$$

where $\dot{q}_{wbm}$ is a joint velocity vector, $J_{wbm}^{\#}(q)$ is pseudo inverse Jacobian of overall joints, and $\dot{x}_{task}$ is task velocity vector.

The matrix $N_{wbm}$ maps an arbitrary joint velocity vector $\xi_{wbm}$ into the null space. Two cost functions can be used for the null space. Let $\alpha_{jc}$ and $\alpha_{ca}$ the step width, then:

$$\xi_{wbm} = -\alpha_{jc}\left(\frac{\partial H_{jc}(q)}{\partial q}\right)^T - \alpha_{ca}\left(\frac{\partial H_{ca}(q)}{\partial q}\right)^T \quad (10)$$

The first cost function penalizes deviations from an arbitrary joint center vector $\tilde{q}$. This cost function seeks to control any joint close to its neutral position. In this regard, a joint limit avoidance cost function is used.

$$H_{jc}(q) = \frac{1}{2}(q-\tilde{q})^T W_{jc}(q-\tilde{q}), \quad (11)$$

where $W_{jc}$ is a weighting matrix. In the simplest case, we choose joint center $\tilde{q}$ accordingly. This cost function allows the joint limits to be avoided easily.

The second one cost function implements the collision avoidance.

$$\frac{\partial H_{ca}(d)}{\partial q} = \frac{\partial H_{ca}(d)}{\partial d} \frac{\partial d}{\partial q} \quad (12)$$

$$= \frac{\partial H_{ca}(d)}{\partial d} J_{ca}^{\#}(q)$$

$$H_{ca}(d) = \frac{1}{2}(d_{safe} - d)^T W_{ca}(d_{safe} - d), \quad (13)$$

where $W_{ca}$ is a weighting matrix for the collision avoidance. Thus, the whole body motion controls joints for the target reaching in null space, the collision avoidance and joint limit avoidance in null space.

C. Integration of Motion Control and Collision Avoidance

The output of the whole body motion control and the output of the collision avoidance motion control are blended into joint velocities according to the closest distance. The final joint velocity vector $\dot{q}$ is $$\dot{q} = \{1-f(d)\}\dot{q}_{wbm} + f(d)\dot{q}_{ca}, \quad (14)$$

where $\dot{q}_{control}$ is the joint velocity vector computed by a robot controller such as whole body motion control, and $\dot{q}_{ca}$ is the joint velocity vector computed by the collision avoidance controller, f(d) is a gain factor which can assume values between 0 and 1 to represent the magnitude of danger of collisions, for example, as a function of the shortest distance between segments. If f(d) is equal to "1", the collision avoidance entirely takes over control. If f(d) is equal to "0", the robot controller entirely takes over control. f(d) is defined as following:

$$f(d) = \begin{cases} \frac{d - d_a}{d_b - d_a} & \text{if } d < d_a \\ 0 & \text{otherwise} \end{cases}$$

$d_b$ is a preset constant threshold distance where the whole body motion control is switched off, wherein $d_a > d_b$.

If d is larger than $d_a$, the collision avoidance control is deactivated and the robot tracks the trajectory which is generated by the whole body motion control. However, trajectories computed by the whole body motion take into account collision avoidance in null space. If d is smaller than $d_a$, the collision avoidance is activated. The ratio between them depends on the shortest distance between the closest segments.

Both the collision avoidance control and the robot control use null space optimization criteria. These criteria are composed of the task space and the null space. The task space always has higher priority than the null space. On one hand, the robot control maps a target reaching motion in the task space and a collision avoidance motion in the null space. On the other hand, the collision avoidance control maps a collision avoidance motion in task space and a target reaching motion in the null space.

|  | motion in task space | motion in null space |
|---|---|---|
| robot control ($\dot{q}_{control}$) | target reaching | collision avoidance |
| collision avoidance control ($\dot{q}_{ca}$) | collision avoidance | target reaching |

As illustrated by the above equation (14), the robot control contribution and the collision avoidance control contribution are blended depending on f(d). When f(d) increases, then the collision avoidance motion becomes more important with respect to robot motions. However, target reaching motions are compiled in the null space in the collision avoidance control and if f(d) is not "1", the robot control contributes to move towards the target. This enables a smooth task priority switching.

EXAMPLE

In order to avoid occlusion problems, a "virtual object" in space is defined and taken into account when performing the collision avoidance. Thus, space can be defined where a robot segment is not allowed to penetrate. This means that an area can be defined where a robot segment is not allowed to enter. Such area may be used as an "occlusion avoidance." One of the major problems when robots grasp something is occlusions that are caused by their hands hiding target objects. In one embodiment of the present invention, a virtual obstacle can be configured and placed between the robot head and the target so that the hands of the robot do not interfere with the robot's view of the target. The virtual object may be inactivated right before the robot reaches to the object.

Embodiments of the present invention relate to a technique for a safety mechanism that protects articulated robots and the environment in which the robot is operating. In particular, embodiments may be employed in robots that interact with dynamic environment that is difficult to predict in real-time. The following are illustrative examples where embodiments of the present invention may be used:

(1) Tracking moving targets that are captured by cameras: Robots need to track moving targets movement of which cannot be predicted while avoiding self collisions at the same time.

(2) Bimanual manipulations: Robots move both arms at the same time according to tasks. Each arm has a target respectively and they sometimes cross each other.

(3) Avoid moving obstacles: Robots need to avoid moving objects such as humans.

The collision avoidance uses only one degree of freedom. On the other hand, target reaching motions are achieved by (1) null space in the collision avoidance control, and (2) task space in the robot control.

By limiting the collision avoidance motion to a single degree-of-freedom, the null space motion of the collision avoidance control allows for a target reaching motion is increased although the collision avoidance control allocates higher priority to the collision avoidance task compared to the target reaching task. Thus, the movement towards a target is more efficient compared to conventional methods While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for controlling a robot having at least one visual sensor, comprising:
   defining a target for a motion of the robot;
   calculating a motion control signal adapted to command the robot to reach the target;
   at a computing device, calculating a collision avoidance control signal based on closest points of segments of the robot and a virtual object, the virtual object adaptively defining a three-dimensional area between the at least one visual sensor and the target and wherein the three-dimensional area representing an area where the segments of the robot are not to enter;
   assigning weights to the motion control signal and the collision avoidance control signal to generate a weighted motion control signal and a weighted collision avoidance control signal, a weight of the motion control signal higher responsive to risk of the segments of the robot colliding with the virtual object being higher;
   combining the weighted motion control signal and the weighted collision avoidance control signal to generate a combined signal; and
   controlling motion of the robot according to the combined signal.

2. The method of claim 1, wherein the virtual object has a shape that is symmetrical around an axis connecting between a center of the at least one visual sensor and a center of the target.

3. The method of claim 1, wherein the virtual object has a shape of a three dimensional ellipsoid.

4. The method of claim 1, wherein the weights are changed gradually over time to perform a soft task switching between motion for reaching the target and collision avoidance.

5. The method of claim 1, wherein calculating the motion control signal comprises mapping a collision avoidance motion in null space and a target reaching motion in task space.

6. The method of claim 5, wherein the null space of the collision avoidance control is assigned to the target reaching motion.

7. The method of claim 1, wherein the weight of the collision avoidance control signal is zero when a distance between the closest points being larger than a predetermined value.

8. The method of claim 1, further comprising performing collision avoidance control by controlling the robot to move a segment of the robot in a direction parallel to a line connecting between the closest points.

9. The method of claim 1, wherein the collision avoidance control signal maps the collision avoidance motion to the task space and the motion control signal maps the target reaching motion to the null space.

10. A computer readable storage medium structured to store instructions executable by a processor in a computing device, the instructions, when executed cause the processor to:
    define a target for a motion of a robot;
    calculate a motion control signal adapted to command the robot to reach the target;
    calculate a collision avoidance control signal based on closest points of segments of the robot and a virtual object adaptively defining a three-dimensional area between one visual sensor of the robot and the target, and wherein the three-dimensional area representing an area where the segments of the robot are not to enter;
    assign weights to the motion control signal and the collision avoidance control signal to generate a weighted motion control signal and a weighted collision avoidance control signal, a weight of the motion control signal higher responsive to risk of the segments of the robot colliding with the virtual object being higher;
    combine the weighted motion control signal and the weighted collision avoidance control signal to generate a combined signal; and
    control motion of the robot according to the combined signal.

11. A motion control unit in a robot having a visual sensor, comprising:
    a distance computing module adapted to calculate a collision avoidance control signal based on two closest points between a segment of the robot and a virtual object, the virtual object adaptively defining a three-dimensional area between the visual sensor and the target and wherein the three-dimensional area representing an area where the segment of the robot is not to enter;
    a motion control module adapted to calculate a motion control signal commanding a robot to reach a target;
    a collision avoidance module adapted to calculate a collision avoidance control signal based on the closest points of the segment of the robot and the virtual object; and
    a blending control unit adapted to assign weights to the motion control signal and the collision avoidance control signal to generate weighted motion control signal and weighted collision avoidance signal, a weight of the motion control signal assigned a higher value responsive to risk of collision being lower, a weight of the collision avoidance control signal assigned a higher value responsive to the risk of collision being higher, the blending control unit further adapted to combine the weighted motion control signal and the weighted collision avoidance control signal to generate a combined weighted signal according to which a motion of the robot is controlled.

12. The motion control unit of claim 11, wherein the robot comprises a humanoid biped robot.

13. The motion control unit of claim 11, wherein the robot comprises a head portion that is moveable relative to a main body of the robot, the head portion comprising two cameras at its front portion.

* * * * *